US011138367B2

(12) United States Patent
Pandit et al.

(10) Patent No.: US 11,138,367 B2
(45) Date of Patent: Oct. 5, 2021

(54) DYNAMIC INTERACTION BEHAVIOR COMMENTARY

(71) Applicant: INTERNATIONAL BUSINESS MACHINES CORPORATION, Armonk, NY (US)

(72) Inventors: Sushain Pandit, Austin, TX (US); Shikhar Kwatra, Durham, NC (US); Jonathan Dunne, Dungarvan (IE); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 16/272,072

(22) Filed: Feb. 11, 2019

(65) Prior Publication Data
US 2020/0257758 A1 Aug. 13, 2020

(51) Int. Cl.
*G06F 40/20* (2020.01)
*G06F 40/169* (2020.01)
(Continued)

(52) U.S. Cl.
CPC .......... *G06F 40/169* (2020.01); *G06F 3/0482* (2013.01); *G06F 16/958* (2019.01);
(Continued)

(58) Field of Classification Search
CPC .......... G06F 40/10; G06F 40/20; G06F 40/30; G06F 40/35; G06F 40/40; G06F 40/56;
(Continued)

(56) References Cited

U.S. PATENT DOCUMENTS 6,574,792 B1 6/2003 Easton
9,400,779 B2 7/2016 Convertino
(Continued)

FOREIGN PATENT DOCUMENTS

JP 2018513468 A 5/2018

OTHER PUBLICATIONS

Knaus, "It's Not What You Say—It's How You Say It!", Psychology Today, Science and Sensibility, Posted Nov. 19, 2013, https://www.psychologytoday.com/us/blog/science-and-sensibility/201311/it-s-not-what-you-say-it-s-how-you-say-it, pp. 1-4.
(Continued)

*Primary Examiner* — Maikhanh Nguyen
(74) *Attorney, Agent, or Firm* — Kenneth K. Han

(57) ABSTRACT

A method, computer system, and computer program product for dynamic interaction behavior commentary are provided. The embodiment may include receiving, by a processor, a plurality of posted comments. The embodiment may also include analyzing the plurality of posted comments based on a semantic distance of the topic of discussion measured by content analysis of the plurality of posted comments. The embodiment may further include determining optimal frameworks for a plurality of users in response to a comment from a user within the plurality of posted comments. The embodiment may also include identifying interaction behavior responses containing statistically significant words or phrases that may improve a tone of the next comment when the user responds to a certain post. The embodiment may further include notifying the user when the next statement is generated based on a pre-identified or dynamically-learned interaction behavior comment. The embodiment may also include prompting the user, via a graphical user interface, with suggested timelines and places where a comment should be inserted.

14 Claims, 6 Drawing Sheets

(51) Int. Cl.
    *G06F 3/0482* (2013.01)
    *G06N 20/00* (2019.01)
    *G06F 16/958* (2019.01)
    *G06F 40/30* (2020.01)
    *G06F 40/289* (2020.01)

(52) U.S. Cl.
    CPC ............ *G06F 40/289* (2020.01); *G06F 40/30* (2020.01); *G06N 20/00* (2019.01)

(58) Field of Classification Search
    CPC .... G06F 40/166; G06F 40/169; G06F 40/211; G06F 40/221; G06F 40/253; G06F 40/284; G06F 40/289; G06F 16/3344; G06F 16/90332; G06N 20/00; G06N 5/02; G06Q 50/01
    See application file for complete search history.

(56) References Cited

U.S. PATENT DOCUMENTS

| | | | | |
|---|---|---|---|---|
| 9,444,705 | B2* | 9/2016 | O'Sullivan | H04L 67/02 |
| 9,654,521 | B2* | 5/2017 | West | G06F 16/683 |
| 9,704,135 | B2* | 7/2017 | Bastide | H04L 65/1089 |
| 10,608,831 | B2* | 3/2020 | West | G06F 16/683 |
| 2010/0042910 | A1* | 2/2010 | Manolescu | G06F 16/9535 715/202 |
| 2010/0318520 | A1 | 12/2010 | Loeb | |
| 2011/0022902 | A1 | 1/2011 | Verma | |
| 2014/0142962 | A1* | 5/2014 | Bhatt | G16H 15/00 705/2 |
| 2014/0188997 | A1* | 7/2014 | Schneiderman | H04L 51/10 709/204 |
| 2014/0282089 | A1* | 9/2014 | West | G06F 16/683 715/753 |
| 2014/0379729 | A1* | 12/2014 | Savage | G06Q 10/10 707/748 |
| 2015/0006646 | A1 | 1/2015 | Jones | |
| 2015/0304186 | A1* | 10/2015 | O'Sullivan | H04L 67/22 709/224 |
| 2016/0253719 | A1 | 9/2016 | Akpala | |
| 2016/0378741 | A1 | 12/2016 | Mullins | |
| 2017/0004207 | A1 | 1/2017 | Baughman | |
| 2018/0146229 | A1 | 5/2018 | Wilms | |
| 2019/0042557 | A1* | 2/2019 | Okubo | G06F 40/253 |

OTHER PUBLICATIONS

Mell et al., "The NIST Definition of Cloud Computing," National Institute of Standards and Technology, Sep. 2011, p. 1-3, Special Publication 800-145.

Quirksmode, "Conditional comments", CSS, http://www.quirksmode.org/css/condcom.html, accessed Feb. 11, 2019, 2 pages.

* cited by examiner

DYNAMIC INTERACTION BEHAVIOR COMMENTARY

BACKGROUND

The present invention relates, generally, to the field of computing, and more particularly to dynamic commentary generation in a computer system.

An internet forum is an online discussion site. The internet has many interactive forums (e.g., blogs, videos postings, social media postings, etc.) that allow users to insert their own input in the form of comments. Such forums are different from chat rooms in that inserted messages are usually longer than one line of text and are at least temporarily archived. A single conversation is called a thread or topic. A forum may contain a number of subforums with several sub-topics. People can post their comments on other individuals' comments and they also can include attachments to their comments. Prospective commenters can be anonymous or first must register with a forum to log in to post comments.

SUMMARY

According to one embodiment, a method, computer system, and computer program product for dynamic interaction behavior commentary are provided. The embodiment may include receiving, by a processor, a plurality of posted comments. The embodiment may also include analyzing the plurality of posted comments based on a semantic distance of the topic of discussion measured by content analysis of the plurality of posted comments. The embodiment may further include determining optimal frameworks for a plurality of users in response to a comment from a user within the plurality of posted comments. The embodiment may also include identifying interaction behavior responses containing statistically significant words or phrases that may improve a tone of the next comment when the user responds to a certain post. The embodiment may further include notifying the user when the next statement is generated based on a pre-identified or dynamically-learned interaction behavior comment. The embodiment may also include prompting the user, via a graphical user interface, with suggested timelines and places where a comment should be inserted.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
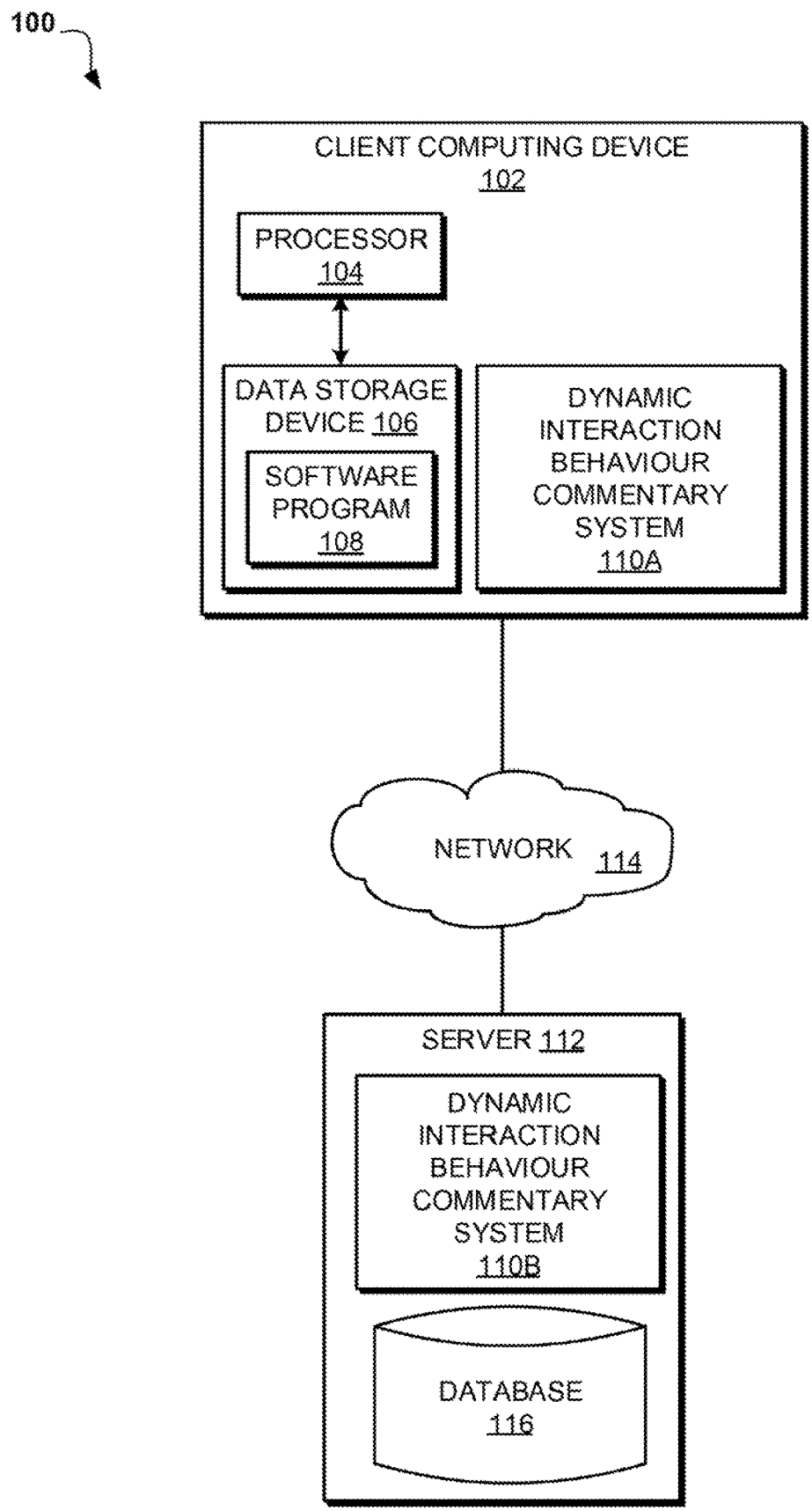
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to dynamic commentary generation in a computer system. The following described exemplary embodiments provide a system, method, and program product to detect remote interactions for a specific topic and improved development or trajectory of a similar dialogue. Therefore, the present embodiment has the capacity to improve the technical field of commentary generation systems by generating a comment model based on the content analysis of the various comments and reducing overheads for management of commentaries to specific posts.

As previously described, an internet forum is an online discussion site. The internet has many interactive forums (e.g., blogs, videos postings, social media postings, etc.) that allow users to insert their own input in the form of comments. Such forums are different from chat rooms in that inserted messages are usually longer than one line of text and are at least temporarily archived. A single conversation is called a thread or topic. A forum may contain a number of subforums with several sub-topics. People can post their comments on other individuals' comments and they also can include attachments to their comments. Prospective commenters can be anonymous or first must register with a forum to log in to post comments.

Increased use of intelligent devices that can access many types of media has also increased the opportunities for people to encounter or access various types of online media, such as blog, video or news website. When people post their comments on online media, commentary may diverge from the main topic or certain questions left by particular users may remain unanswered by the original author of the post or other commenters. Many individuals or organizations wish to increase or improve multiple users' interactions with particular posts or threads, but they may not have the time or resources to maintain or respond to particular commentaries that might be generated by users or bots. Also, when people write and leave their commentaries to a specific post, it may be difficult to assess the authors or commenters' tones or nuances.

Unanswered questions or comments may frustrate the purpose of the original posts or comments. Further, commentaries may diverge from the main topic, which the original author might not appreciate nor want to further create content for. Further, the author may have to go through unnecessary processes of going back and forth to find appropriate interactions or comments from a thread. For example, if a commenter wants people to answer their comments on a web post, but there is no response or follow-up comments posted on the original comment, it would be advantageous to have a system that may autonomically manage the desired interaction. As such, it may be advantageous to, among other things, implement a system capable of engaging the original commenter with relevant content and encouraging other people to dynamically interact with posts even when no one seems to be available to assist or have appropriate responses or comments to a thread.

According to one embodiment, a dynamic interaction behavior commentary system may detect remote interactions for a specific topic and manage members or posts of a specific dialogue in accordance with the sequences of the previous dialogues. In at least one embodiment, the dynamic interaction behavior commentary system may analyze the content of posted comments and measure the relevance of the comments based on the semantic analysis of the topic of discussions. In at least one other embodiment, the dynamic interaction behavior commentary system may determine an optimal template or framework for subsequent users in response to a comment from the first user.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for detecting remote interactions for a specific topic and determining an optimal template or framework for subsequent users in response to a comment from the first user.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a dynamic interaction behavior commentary system 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a dynamic interaction behavior commentary system 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the dynamic interaction behavior commentary system 110A, 110B may be a program capable of collecting and analyzing data related to remote posts that discuss similar topics and generating a comment model based on the content analysis of the various comments. The dynamic interaction behavior commentary system 110A, 110B may also utilize a deep neural net architecture to train a model in order to learn how to classify a comment text into one of several comment classes. The dynamic interaction behavior commentary system 110A, 110B may further analyze the customer's historic purchase data to determine purchasable products or services and generate targeted promotions on such products or services. The cognitive event-related promotion generation process is explained in further detail below with respect to FIG. 2.

Figure 2:
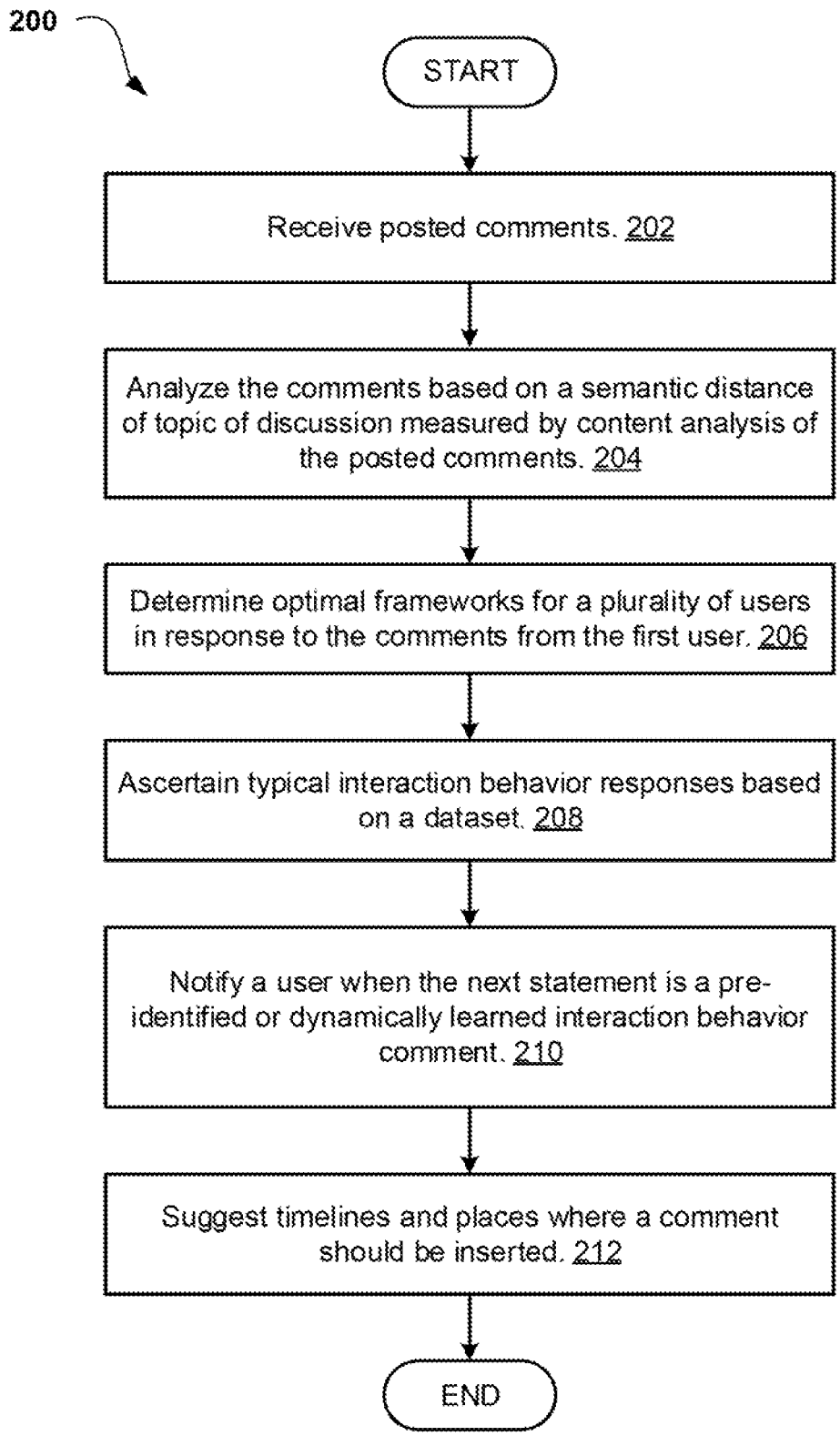
FIG. 2 is an operational flowchart illustrating a dynamic interaction behavior commentary process according to at least one embodiment.

FIG. 2 is an operational flowchart illustrating a dynamic interaction behavior commentary process 200 according to at least one embodiment. At 202, the dynamic interaction behavior commentary system 110A, 110B receives posted comments. According to one embodiment, the dynamic interaction behavior commentary system 110A, 110B may receive a comment that a user posted on websites, blog or social media, etc. For example, when a user wants to post a question after reading a news article, such as "Is there any similar new article?", the dynamic interaction behavior commentary system 110A, 110B may receive the user's questions as a posted comment and may also determine whether there are any follow-up comments subsequently posted.

At 204, the dynamic interaction behavior commentary system 110A, 110B analyzes the user-posted comment(s) based on a semantic distance of topic of discussion from content analysis of the posted comment(s). According to one embodiment, the dynamic interaction behavior commentary system 110A, 110B may access the similar posts and extract certain parameters, such as timestamping of relevant comments and frequency of similar comments to generate a comment model. For example, a clustering algorithm may be used with natural language processing (e.g. keyword extraction) for sentence segmentation and categorizing different posts into different topics or subsets. Then Cosine or Pearson correlation algorithms may be used to determine the relationships of similar posts or threads. In at least one other embodiment, the dynamic interaction behavior commentary system 110A, 110B may utilize a crowdsourced method of user's likes/views regarding particular comments to determine a threshold level for responding to certain comments. For example, if user A posts a comment on some news article asking an unrelated question, the dynamic interaction behavior commentary system 110A, 110B may access similar questions and check its likes or views to determine whether the number of likes or views satisfies a pre-configured threshold to generate a comment model or response to the user posted question.

At 206, the dynamic interaction behavior commentary system 110A, 110B determines optimal frameworks or templates for a plurality of users in response to the first user comment. According to one embodiment, in order to determine the optimal template or framework for user B in response to a comment from user A, the dynamic interaction behavior commentary system 110A, 110B may utilize a machine learning component that relies on a deep neural net architecture. The deep neural net architecture may be utilized to train and generate comment models and may learn how to classify a comment text into one of the several comment classes, each with its own template. The dynamic interaction behavior commentary system 110A, 110B may learn to assist the system in presenting an optimal framework for user B as it may learn more about the nature of profiles similar to user A. The deep learning architecture may be comprised of i) a layer to embed a dense vector representation of comment by using Tf-idf or one of the other frequency representations; ii) a layer to embed comment metadata, such as time, date, day, user profile, etc; iii) a layer to capture user's past interaction with the system. For example, if user A already interacted with the system in the past by leaving a comment or question, and user B leaves a similar question several days later, the patience threshold of the first user A may be less than that of user B, and the learning phase may need to accommodate user A's past interaction.

At 208, the dynamic interaction behavior commentary system 110A, 110B ascertains typical interaction behavior responses based on a dataset. According to one embodiment, the dynamic interaction behavior commentary system 110A, 110B may access a database to find statistically significant words or phrases that may improve a commenter's tone when responding to a certain post. For example, when user B tries to post an answer to user A's question posted a day ago, using a strong or negative words or phrases, the dynamic interaction behavior commentary system 110A, 110B may recommend better choices of words or phrases based on the dataset related to the same or similar topics or questions. Likewise, the dynamic interaction behavior commentary system 110A, 110B may ascertain the likelihood of any proceeding comments being valid (i.e., above a pre-configured threshold of certainty). According to one other embodiment, the dynamic interaction behavior commentary system 110A, 110B may utilize an analytical or statistical method to predict any other likely outcomes from the initial statement. For example, the dynamic interaction behavior commentary system 110A, 110B may predict certain development or trajectory of the follow-up comments that may contain a mirroring or symmetrical content even though there may be different perspectives from different users.

At 210, the dynamic interaction behavior commentary system 110A, 110B notifies a potential commenter, a perspective contributor or a person viewing a comment thread if the next statement is a pre-identified or dynamically learned interaction behavior comment. According to one embodiment, the dynamic interaction behavior commentary system 110A, 110B may monitor the life cycle of a perspective topic over time for a given location and a user. The dynamic interaction behavior commentary system 110A, 110B may access various online forums or communities to find typical behavior of a specific user. The dynamic interaction behavior commentary system 110A, 110B may also monitor statistical keywords and determine if a perspective topic should be given wide collaboration control or if there should be any limits on the user perspective. The dynamic interaction behavior commentary system 110A, 110B may utilize a natural language API to process particular comments to understand the relationship or similarity of the proximate interaction behavior and also to visualize the trajectory of the interactions. For example, the dynamic interaction behavior commentary system 110A, 110B may utilize a natural language API to show that although user B and user C exhibited an interaction behavior type of positive engagement, it may determine that the tone difference of the original commenter is quite negative, and thus the dynamic interaction behavior commentary system 110A, 110B may recommend and notify a new interaction or comments in different tones.

At 212, the dynamic interaction behavior commentary system 110A, 110B suggests timelines and places where a comment should be inserted. According to one embodiment, the dynamic interaction behavior commentary system 110A, 110B may suggest a model or skeleton response to a threat that exhibits words or phrases that are in line with the tone trajectory of the thread. For example, if tones of previously posted comments are determined to be cheerful and encouraging, the dynamic interaction behavior commentary system 110A, 110B may suggest that a proceeding post contain words or phrases in cheerful or encouraging tones. According to at least one other embodiment, the dynamic interaction behavior commentary system 110A, 110B may suggest timelines for a comment insertion and location(s) where such comment may be inserted. For example, the dynamic interaction behavior commentary system 110A, 110B may determine 15 mins is the right timeline for insertions of a new comment after a specific question was posted based on the analysis of similar behavior of the same user in the past. The dynamic interaction behavior commentary system 110A, 110B may suggest where such a post can be inserted if there are several discussions regarding different topics and several individuals try to post their comments on different topics almost simultaneously. The dynamic interaction behavior commentary system 110A, 110B may also be manually configured to scan and look for triggers at a pre-defined interval. Such triggers may be user preferences for responses, such as location, timing and properties of the content (e.g. appearance).

Figure 3:
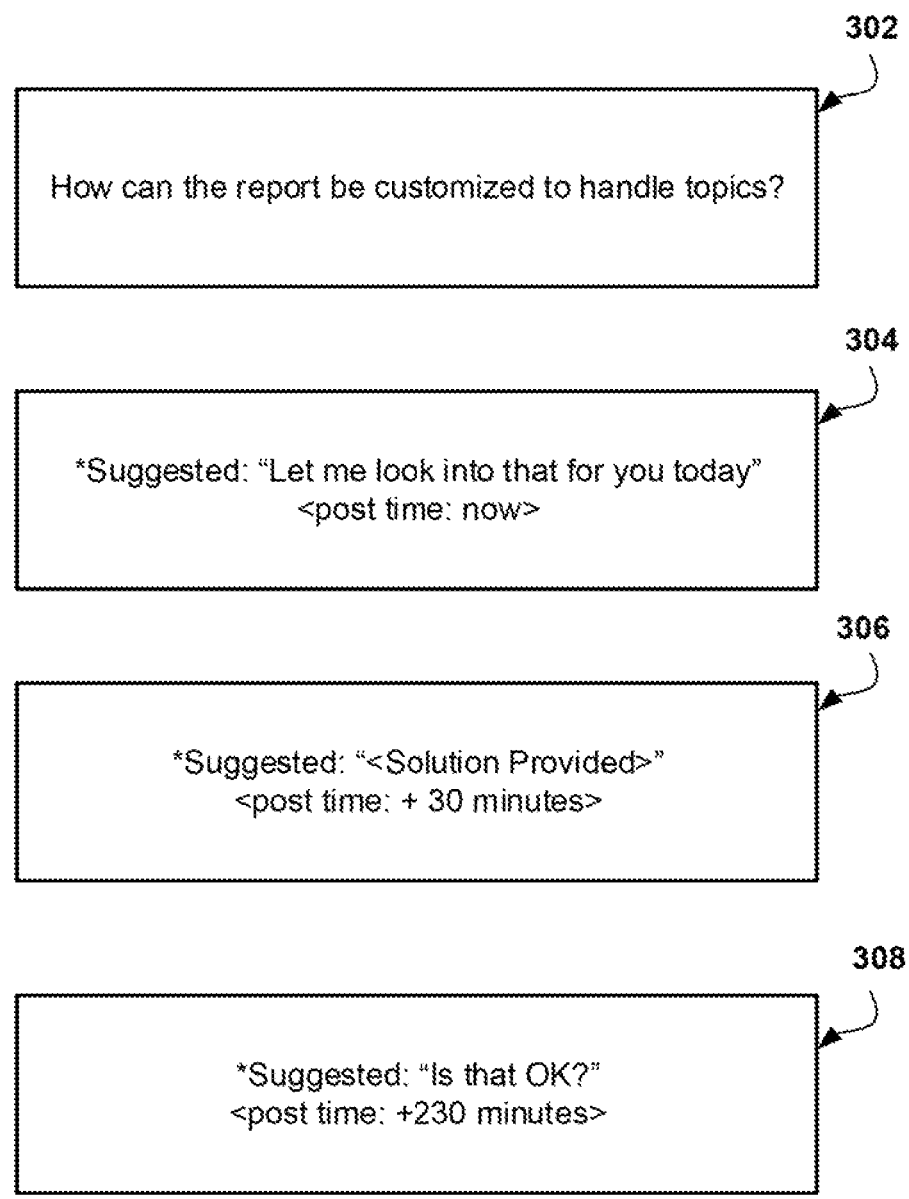
FIG. 3 is a graphic representation of an exemplary user interface demonstrating interaction behavior dialogue.

Referring now to FIG. 3, a graphic representation of an exemplary user interface demonstrating interaction behavior dialogue is depicted according to at least one embodiment. For example, User A posts a comment 302 but there is no response for 30 minutes. The dynamic interaction behavior commentary system 110A, 110B may start handling the interaction behavior dialogue by creating a framework around the post. For example, user B may see the posts generated by the dynamic interaction behavior commentary system 110A,110B (i.e. posts 304-306). The post 304 is posted now and the next post 306 may be posted 30 minutes later and another follow-up comment 230 minutes later. When user B sees the above comments, user B knows that some interactions are taking place around the original post and the dynamic interaction behavior commentary system 110A, 110B has provided a framework to follow up (i.e. solution). Now user B may review the provided solution and add a comment or additional question to this thread.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the dynamic interaction behavior commentary system 110A, 110B may utilize a natural language processing engine and a scoring mechanism to identify unexpected development of a thread in an unacceptable fashion, then the dynamic interaction behavior commentary system 110A, 110B may notify a user of such development and take evasive action. In one other embodiment, the dynamic interaction behavior commentary system 110A, 110B may generate a modifiable or additional element to include in the already posted user comment and present each proposal to a user for a selection.

Figure 4:
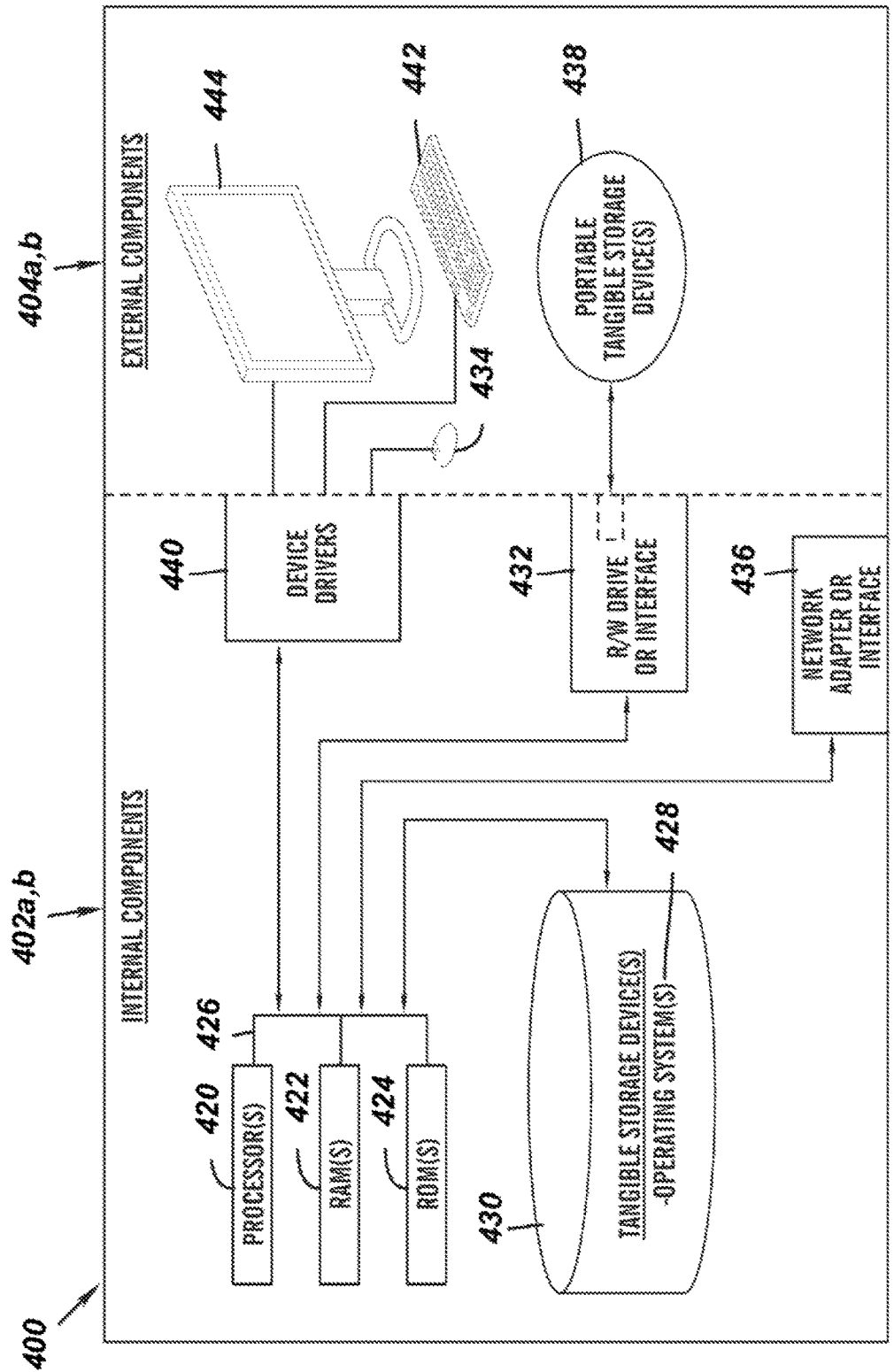
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the dynamic interaction behavior commentary system 110A in the client computing device 102 and the dynamic interaction behavior commentary system 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the dynamic interaction behavior commentary system 110A, 110B can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the dynamic interaction behavior commentary system 110A in the client computing device 102 and the dynamic interaction behavior commentary system 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the dynamic interaction behavior commentary system 110A in the client computing device 102 and the dynamic interaction behavior commentary system 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
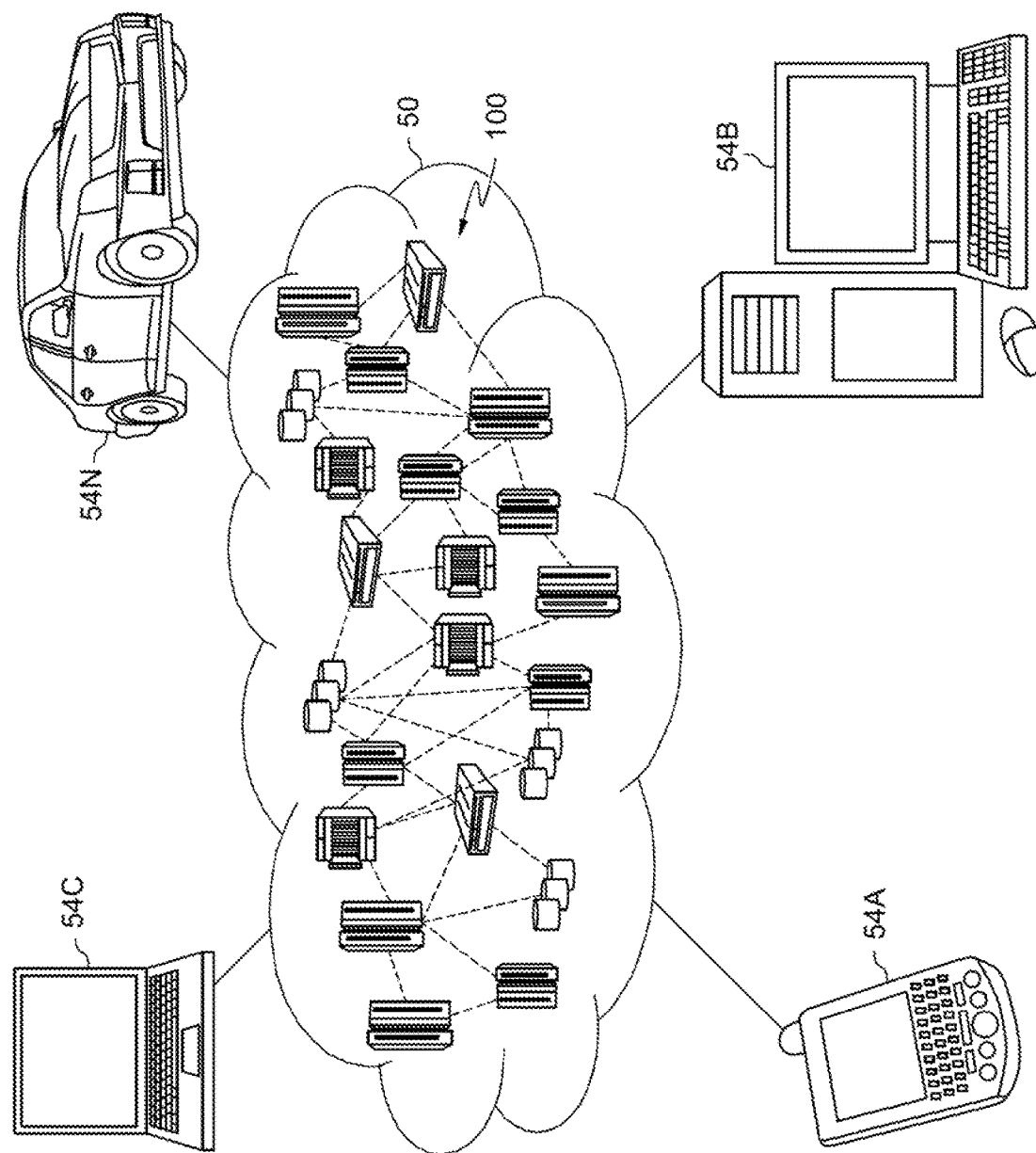
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
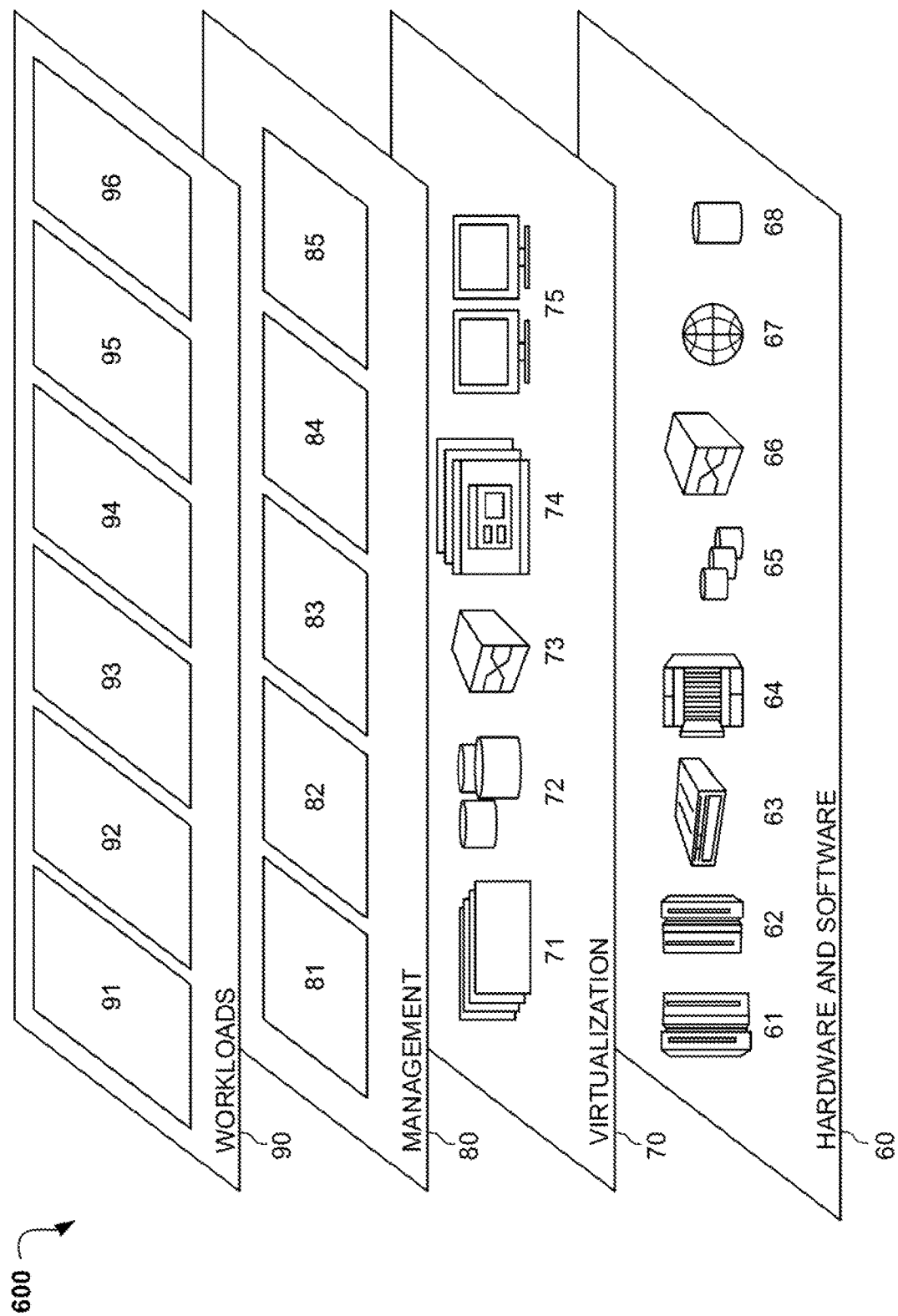
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic interaction behavior commentary 96. Dynamic interaction behavior commentary 96 may relate to generating a comment model based on a user's past interactions or comments related to the same or similar topics.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for dynamic interaction behavior commentary, the method comprising:
   receiving, by a processor, a plurality of posted comments;
   analyzing the plurality of posted comments based on a semantic distance of the topic of discussion measured by content analysis of the plurality of posted comments, wherein the plurality of posted comments are analyzed using a deep learning architecture, wherein the deep learning architecture is utilized to generate and train a model to classify a comment text into one of a plurality of appropriate pre-configured comment classes;
   determining optimal frameworks for a plurality of users in response to a comment from a user within the plurality of posted comments, wherein a template is generated using a machine learning technology based on the determined optimal frameworks;
   identifying interaction behavior responses containing statistically significant words or phrases that may improve a tone of the next comment when the user responds to a certain post using a strong or negative words or phrases, wherein better choices of words or phrases are recommended to the user, wherein a likelihood of validity of preceding comments using the recommended words or phrases is ascertained when exceeding a pre-configured threshold of certainty;
   notifying the user when the next statement is generated based on a pre-identified or dynamically-learned interaction behavior comment; and
   prompting the user, via a graphical user interface, with suggested timelines and places where a comment should be inserted.

2. The method of claim 1, further comprising:
   prompting the user, via a graphical user interface, with suggested skeleton responses to a thread that contains words or phrases that are in line with a tone trajectory of the thread.

3. The method of claim 1, wherein the deep learning architecture comprises a layer to embed a dense vector representation of comment text, a layer to embed comment metadata and a layer to capture a user's past interaction.

4. The method of claim 1, further comprising:
   generating a proposal of modifiable elements or additional elements to include in the posted user comment.

5. The method of claim 4, further comprising:
   presenting the proposal to the user for a selection.

6. A computer system for dynamic interaction behavior commentary, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   receiving, by a processor, a plurality of posted comments;
   analyzing the plurality of posted comments based on a semantic distance of the topic of discussion measured by content analysis of the plurality of posted comments, wherein the plurality of posted comments are analyzed using a deep learning architecture, wherein the deep learning architecture is utilized to generate and train a model to classify a comment text into one of a plurality of appropriate pre-configured comment classes;
   determining optimal frameworks for a plurality of users in response to a comment from a user within the plurality of posted comments, wherein a template is generated using a machine learning technology based on the determined optimal frameworks;
   identifying interaction behavior responses containing statistically significant words or phrases that may improve a tone of the next comment when the user responds to a certain post using a strong or negative words or phrases, wherein better choices of words or phrases are recommended to the user, wherein a likelihood of validity of preceding comments using the recommended words or phrases is ascertained when exceeding a pre-configured threshold of certainty;
   notifying the user when the next statement is generated based on a pre-identified or dynamically-learned interaction behavior comment; and
   prompting the user, via a graphical user interface, with suggested timelines and places where a comment should be inserted.

7. The computer system of claim 6, further comprising:
   prompting the user, via a graphical user interface, with suggested skeleton responses to a thread that contains words or phrases that are in line with a tone trajectory of the thread.

8. The computer system of claim 6, wherein the deep learning architecture comprises a layer to embed a dense vector representation of comment text, a layer to embed comment metadata and a layer to capture a user's past interaction.

9. The computer system of claim 6, further comprising:
   generating a proposal of modifiable elements or additional elements to include in the posted user comment.

10. The computer system of claim 6, further comprising:
    presenting the proposal to the user for a selection.

11. A computer program product for dynamic interaction behavior commentary, the computer program product comprising:
    one or more computer-readable tangible storage media and program instructions stored on at least one of the one or more tangible storage media, the program instructions executable by a processor of a computer to perform a method, the method comprising:
    receiving, by a processor, a plurality of posted comments;
    analyzing the plurality of posted comments based on a semantic distance of the topic of discussion measured by content analysis of the plurality of posted comments, wherein the plurality of posted comments are analyzed using a deep learning architecture, wherein the deep learning architecture is utilized to generate and train a model to classify a comment text into one of a plurality of appropriate pre-configured comment classes;
    determining optimal frameworks for a plurality of users in response to a comment from a user within the plurality of posted comments, wherein a template is generated using a machine learning technology based on the determined optimal frameworks;
    identifying interaction behavior responses containing statistically significant words or phrases that may improve a tone of the next comment when the user responds to a certain post using a strong or negative words or phrases, wherein better choices of words or phrases are recommended to the user, wherein a likelihood of validity of preceding comments using the recommended words or phrases is ascertained when exceeding a pre-configured threshold of certainty;

notifying the user when the next statement is generated based on a pre-identified or dynamically-learned interaction behavior comment; and prompting the user, via a graphical user interface, with suggested timelines and places where a comment should be inserted.

12. The computer program product of claim 11, further comprising:

prompting the user, via a graphical user interface, with suggested skeleton responses to a thread that contains words or phrases that are in line with a tone trajectory of the thread.

13. The computer program product of claim 11, wherein the deep learning architecture comprises a layer to embed a dense vector representation of comment text, a layer to embed comment metadata and a layer to capture a user's past interaction.

14. The computer program product of claim 11, further comprising:

generating a proposal of modifiable elements or additional elements to include in the posted user comment.

* * * * *